United States Patent
Boskovitch et al.

(10) Patent No.: US 6,882,129 B2
(45) Date of Patent: Apr. 19, 2005

(54) BATTERY PACK FOR A BATTERY-POWERED VEHICLE

(75) Inventors: Paul E. Boskovitch, Shelby Township, MI (US); Gregory N. Simopoulos, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 1 day.

(21) Appl. No.: 10/397,612

(22) Filed: Mar. 26, 2003

(65) Prior Publication Data

US 2004/0189248 A1 Sep. 30, 2004

(51) Int. Cl.$^7$ ............................................. H01M 10/46
(52) U.S. Cl. ........................................................ 320/119
(58) Field of Search ................................ 320/116, 117, 320/118, 124, 126, 127, 128, 132, 134, 119, 150

(56) References Cited

U.S. PATENT DOCUMENTS 6,462,510 B1 * 10/2002 Takada et al. ............... 320/116

2003/0107352 A1 * 6/2003 Downer et al. ............... 322/40

* cited by examiner

Primary Examiner—Edward H. Tso
(74) Attorney, Agent, or Firm—Christopher DeVries

(57) ABSTRACT

A battery pack for a battery-powered vehicle is provided in accordance with the present invention. The battery pack for the battery-powered vehicle comprises battery modules coupled in series. The battery modules are configured to provide power to the battery-powered vehicle and each of the battery modules has a state-of-charge. The battery pack also comprises battery control modules (BCMs) that are coupled to the battery modules. Each of the battery modules is coupled to one of the BCMs and each of BCMs is configured to monitor a battery module parameter. Furthermore, the battery pack comprises a battery control interface module (BCIM) coupled to each of the BCMs. The BCIM is configured to receive the battery module parameter from each of the BCMs and independently adjust the state-of-charge of each of the battery modules based on the battery module parameter.

19 Claims, 2 Drawing Sheets

BATTERY PACK FOR A BATTERY-POWERED VEHICLE

TECHNICAL FIELD

The present invention relates generally to a battery pack, and more particularly to a battery pack for a battery-powered vehicle.

BACKGROUND OF THE INVENTION

New technologies have been developed to reduce our society's reliance on fossil fuels. For example, electric vehicles have been developed that are operated on battery power. These battery-powered vehicles are becoming increasingly economical, both in purchase price and operational cost, and the battery-powered vehicles are at least partially powered by battery packs. The battery packs generally provide power for propelling the vehicle and powering the various electrical systems used by the driver and other vehicle occupants.

One type of battery-powered vehicle is known as a hybrid vehicle. The hybrid vehicle employs a combustion engine coupled with a combination electric motor-generator in order to provide vehicle locomotion. In some hybrid or mild-hybrid powertrain systems, an electric motor-generator system replaces the conventional starter motor and alternator. When the hybrid vehicle is decelerating or is stopped, the fuel flow to the engine is shut off to improve fuel economy. While the hybrid vehicle is at a standstill, the engine is not turning. The motor-generator system and battery pack of the hybrid vehicle enable this fuel cutoff feature while minimally affecting drivability.

In a strong-hybrid powertrain with an automatic transmission, when the brake pedal is released after a stop, the motor-generator system spins up the engine, and creeps the vehicle forward, similar to a conventional vehicle with an automatic transmission. The engine combustion can be commenced after some period of time, or upon activation of the accelerator pedal. When the driver accelerates, the combustion engine restarts automatically and the hybrid vehicle can be driven in a conventional manner. When the combustion engine is running, the motor-generator acts as a generator to supply the hybrid electric vehicle's electrical power requirements, as well as recharging the battery pack of the vehicle. The vehicle's battery pack and a DC-to-DC converter support the vehicle's electrical loads (fans, radio, etc.) whenever the combustion engine is off.

While the use and adoption of battery powered vehicles, including hybrid vehicles, has numerous advantageous, it can also present a need for additional design considerations, particularly with regard to the battery pack. For example, individual batteries and battery modules formed of one or more batteries, which for the battery pack, generally do not have the same capacity and certain deviations in capacity may occur due to manufacturing and other variances. Considering a normal distribution of capacity for the batteries or battery modules, the weakest battery or battery module in the battery pack may become a limiting factor in the battery pack, thereby decreasing overall efficiency. In an effort to maximize the energy output of the battery pack, some batteries or battery modules may be "overcharged" in order to ensure that the batteries or battery modules have been charged to at least the minimum level of the battery or battery module with the highest capacity, thereby causing an overcharge of those batteries or battery modules with a lower capacity. This overcharging can produce undesirable effects such as decreasing overall battery life.

Similarly, undercharging is undesirable because the battery pack efficiency can be reduced and battery life can also be prematurely shortened. In addition, minor variations in the state-of-charge for the different batteries or battery modules can lead to inefficient energy distribution and to more frequent charging cycles, which also tends to shorten the life of the batteries. These problems, and other similar problems known to those skilled in the art, continue to be the source of operational and maintenance difficulties for battery-power vehicles.

In view of the foregoing, it should be appreciated that it would be desirable to provide battery packs for battery-powered vehicles that address the existing deficiencies previously described and other deficiencies not specifically mentioned in this background of the invention. Furthermore, additional desirable features will become apparent to one skilled in the art from the foregoing background of the invention and following detailed description of a preferred exemplary embodiment and appended claims.

BRIEF SUMMARY OF THE INVENTION

A battery pack for a battery-powered vehicle is provided in accordance with the present invention. The battery pack for the battery-powered vehicle comprises a plurality of battery modules coupled in series. The plurality of battery modules are configured to provide power to the battery-powered vehicle and each of the plurality of battery modules has a state-of-charge. The battery pack also comprises a plurality of battery control modules that are coupled to the plurality of battery modules. Each of the plurality of battery modules is coupled to one of the plurality of battery control modules and each of the plurality of battery control modules is configured to monitor a battery module parameter. Furthermore, the battery pack comprises a battery control interface module coupled to each of the plurality of battery control modules. The battery control interface module is configured to receive the battery module parameter from each of the plurality of battery control modules and independently adjust the state-of-charge of each of the plurality battery modules based on the battery module parameter.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

Generally, the present invention provides a battery pack for a battery-powered vehicle, which can be an electric and hybrid electric vehicle, or any other type of vehicle. In the most preferred embodiments of the present invention, a single battery control module (BCM) is used to monitor the operational environment and status of single battery module, which are coupled in a series configuration. Based on a battery module parameter, such as temperature, voltage, battery impedance, battery pack current, and BCM equalizing current, the BCM determines the state-of-charge. As used herein, the state-of-charge of a battery/battery module shall mean the ratio of the amount of energy stored in the battery/battery module to the energy storage capacity of the battery/battery module (i.e., state-of-charge=amount of energy stored in the battery/battery module÷energy storage capacity of the battery/battery module). The amount of energy stored in or delivered from each battery module is monitored and, the amount of energy stored in each battery module and/or delivered by each battery module will be independently adjusted by a battery control interface module (BCIM) to balance/equalize the amount of energy distributed among the battery modules.

Figure 1:
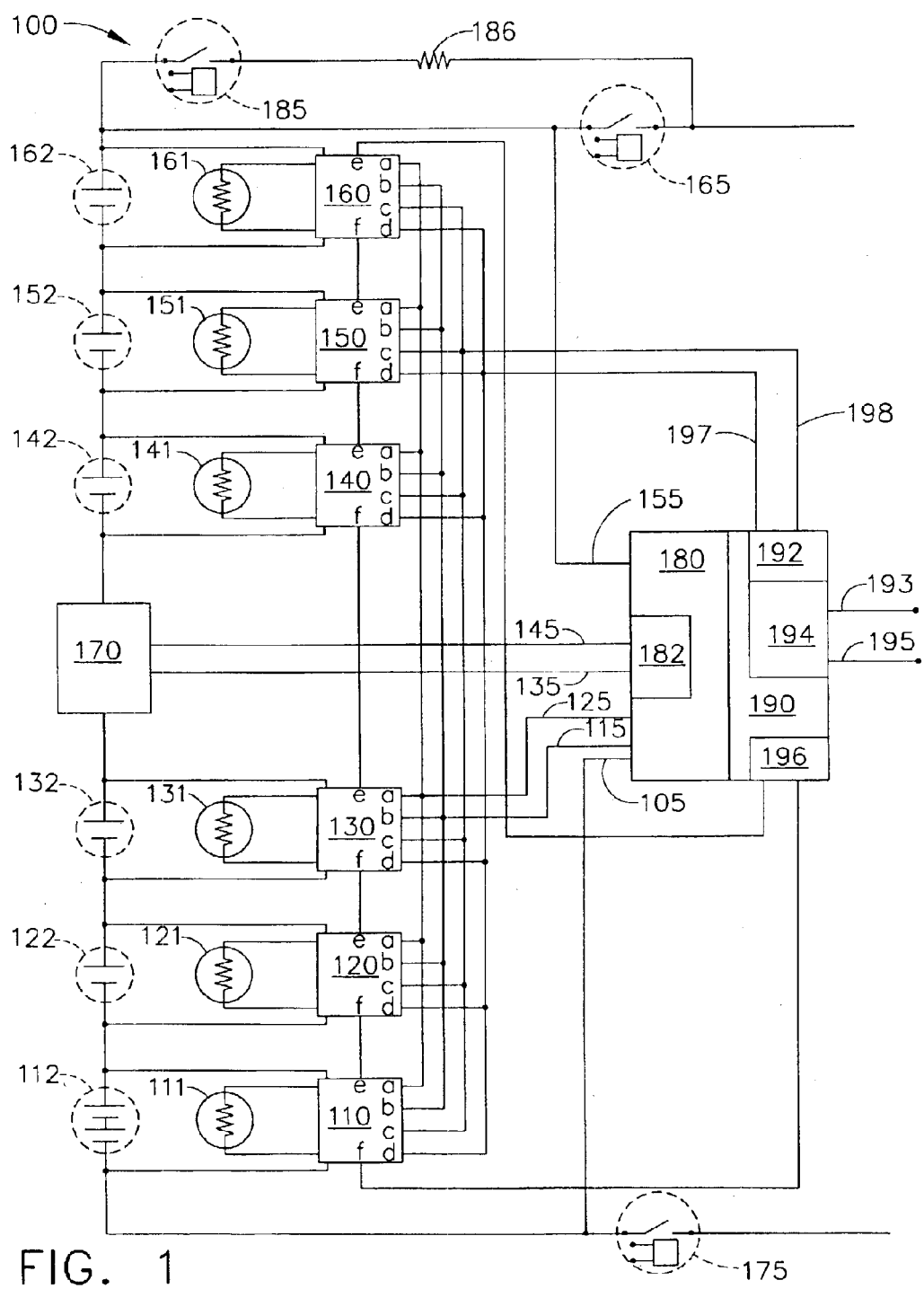
FIG. 1 is a schematic representation of a battery pack for a battery-powered vehicle in accordance with a preferred exemplary embodiment of the present invention.

More specifically, and with reference to FIG. 1, a battery pack 100 is illustrated according to a preferred embodiment of the present invention. The battery pack 100 comprises battery modules (112, 122, 132, 142, 152, 162) that are coupled in series and configured to provide power to a battery-powered vehicle (not shown). Each of the battery modules (112, 122, 132, 142, 152, 162) has a state-of-charge. The battery pack 100 also comprises BCMs (110, 120, 130, 140, 150, 160) coupled to the battery modules (112, 122, 132, 142, 152, 162), with each of the battery modules (112, 122, 132, 142, 152, 162) coupled to one of the BCMs (110, 120, 130, 140, 150, 160), and each of the BCMs (110, 120, 130, 140, 150, 160) configured to monitor a battery module parameter, which is preferably related to the state-of-charge. The battery pack 100 also comprises a BCIM 190 that is coupled to each of the BCMs (110, 120, 130, 140, 150, 160). The BCIM 190 is configured to receive the battery module parameter from each of the BCMs (110, 120, 130, 140, 150, 160) and independently adjust the state-of-charge of each of the battery modules (110, 120, 130, 140, 150, 160) based on the battery module parameter. The battery modules (112, 122, 132, 142, 152, 162) can comprise a single battery as shown for one of the battery modules (e.g., battery module 122), or the battery modules (112, 122, 132, 142, 152, 162) can comprise multiple batteries as shown for another one of the battery modules (e.g., battery module 112). The exact number of batteries in a given battery module will vary, depending on the exact technology under consideration and the application of the battery module. Furthermore, while a single BCM is illustrated for each battery module, other implementations are possible. For example, a single BCM can be coupled to multiple battery modules and configured to manage each of the battery modules.

For one embodiment of the present invention, the battery pack 100 is one of several battery packs configured within an electric or hybrid electric vehicle, and the battery pack 100 can be connected to an external power source (not shown), such as a high voltage bus, via an inlet or charging receptacle (not shown). The battery pack 100 can be connected or disconnected from the power source with any number of mechanisms. For example, a first relay 165, second relay 175 and third relay 185 are used to engage and disengage the battery pack 100 from a power source, such as a high-voltage bus. The first relay 165 is preferably an electromechanical contactor used to connect the positive side of battery pack 100 to the positive side of the power source. Similarly, the second relay 175 is preferably an electro-mechanical contactor used to connect the negative side of battery pack 100 to the negative side of the power source, and the second relay 175 is typically closed with zero current. The third relay 185 is preferably an electro-mechanical contactor or optically isolated solid-state switch integrated into the BCIM 190, and the third relay is connected in series with a pre-charge resistor 186. When the voltage of the power source reaches greater than approximately ninety percent (90%) of the desired voltage for the battery pack 100, the first relay 165 is closed and the third relay 185 is opened. Preferably, the first relay 165 will only close if the voltage of the power source is within the range of ninety percent (90%) to one hundred and five percent (105%) of the desired voltage for the battery pack 100.

The BCIM 190 is used to control the operational functions of the battery pack 100 and independently adjust the state-of-charge of each of the battery modules (112, 122, 132, 142, 152, 162) so as to balance and/or equalize the amount of energy distributed among the battery modules (112, 122, 132, 142, 152). Depending on the state-of-charge determined for each of the battery modules (112, 122, 132, 142, 152), the BCIM 190 will determine the battery modules (112, 122, 132, 142, 152) that will receive equalizing current. For example, and in accordance with the present invention, the BCIM 190 is configured to provide the equalization current to one of the battery modules to adjust the state of charge of the individual battery without providing the equalization current to other battery modules (i.e., independently adjusting the state-of-charge of one of the battery modules).

As previously described in this detailed description of the invention, the BCIM 190 receives the battery module parameter from each of the BCMs (110,120,130,140,150, 160). The BCMs (110,120,130,140,150,160) are provided to monitor the status and condition for the individual battery modules (112,122,132,142,152,162) contained within battery pack 100. The BCMs (110,120,130,140,150,160) can be adapted for various battery technologies, including lead-acid batteries, nickel-metal-hydride batteries, or lithium batteries. It should be noted that the present invention can be used to manage the battery system at the battery level or the cell grouping level and each BCM will manage a specific cell grouping or battery module. Each individual battery, cell grouping, and/or battery module will have a BCM associated with it and the BCM for each battery module will control the charging and distribution of energy for the battery module under its control and under the direction of BCIM 190. The BCMs (110,120,130,140,150,160) are most preferably connected together in a series configuration, and while the number of BCMs and battery modules used in the current exemplary embodiment is six (6), it should be understood that more or fewer battery modules and BCMs can be deployed in accordance with the present invention, and other configurations can be utilized other than a series configuration.

Each of the BCMs (110,120,130,140,150,160) will preferably contain one or more processors and memory storage capability for processing information. Additionally, each of the BCMs (110,120,130,140,150,160) preferably has an isolated converter as an output and this output is used to control the flow of current for the charging/discharging of the battery module. Each of the BCMs (110,120,130,140, 150,160) also preferably has an external temperature sensor (111,121,131,141,151,161) for monitoring the temperature of its associated battery module. Finally, the BCMs (110, 120,130,140,150, 160) will preferably acquire data synchronously upon command from BCIM 190 and report the status of its associated battery module back to the BCIM 190.

Each of the BCMs (110,120,130,140,150,160) preferably has at least one communication links and more preferably multiple communication links (115,125,197,198) that can be used to transmit various signals to and from each of the BCMs (110,120,130,140,150,160). The communication links (115,125,197,198) associated with the BCMs (110,120, 130,140,150,160) are most preferably optically isolated communication links. However, any number of communication links can be utilized in accordance with the present invention. Each of the BCMs (110,120,130,140,150,160) measures the amount of equalizing charge current provided to its respective battery module, and this data is subsequently communicated to the BCIM 190 with one or more of the communication links (115,125,197,198). In addition, a current sensor 170 monitors the amount of current flowing through the series configuration of battery modules (112, 122,132,142,152,162), and this data is communicated to the BCIM 190 with a communication links (115,125,197,198).

A Pack System Power Module (PSPM) 180 of the BCIM 190 preferably includes a current sense module 182 that receives the information related to the amount of current flowing through the series configuration of the battery modules (112,122,132,142,152,162) as monitored by the current sensor 170. The PSPM 180 contains an isolated DC-to-DC power converter and converts energy from the power source (e.g., vehicle high-voltage bus) and transforms the energy for use by the battery pack 100. The PSPM 180 also isolates the power source from the components of the battery pack 100. Additionally, the PSPM 180 provides a physical connection for controlling the redistribution of battery pack energy from battery modules of higher energy to battery modules of lower energy contained within battery pack 100.

In addition to the PSPM, the BCIM 190 also preferably includes a data interface 192, an index interface 196, and a system data interface 194. In the most preferred embodiments of the present invention, the data interface 192 utilizes a first communication link 197 of the communication links (115,125,197,198) as a first serial data line and a second communication link 198 of the communication links (115, 125,197,198) as a second serial data line. However, those skilled in the art will recognize that other forms of data transmission may be implemented in accordance with the present invention. The first communication link 197 preferably transmits a serial data signal from the BCIM 190 to each of the BCMs (110,120,130,140,150,160) and the second communication link 198 preferably transmits a serial data signal from each of BCMs (110,120,130,140,150,160) to the BCIM 190. The BCIM 190 contains one or more processors that control the operation of the BCIM 190 and the BCMs (110,120,130,140,150,160), and the BCIM 190 contains a series of high-level methods used to monitor and control individual battery modules based on the parameters returned to the BCIM 190 from BCMs (110,120,130,140, 150,160) via the second communication link 198. The BCIM 190 uses these returned parameters to provide high-level control of the battery modules (112,122,132,142,152, 162) in battery pack 100. The returned parameters can take any number of forms, such as control set-points used by BCMs (110,120,130,140,150,160) to provide the state-of-charge balancing of the battery modules (112,122,132,142, 152,162). The BCIM 190 also preferably communicates with an off-board battery charger (not shown) through a charge-port interface (not shown), and the BCIM 190 also manages the synchronous acquisition from the BCMs (110, 120,130,140,150,160).

As can be appreciated, managing the synchronous acquisition can be accomplished with numerous techniques. For example, the index interface 196 of the BCIM 196 is provided for transmitting an index signal to and from the BCMs (110,120,130,140,150,160). The index signal acts as a "handshake" signal and is sent from index interface 196 to a first BCM 110. The first BCM 110 receives the index signal from the index interface 196 through a first index signal input connection (f) and passes the index signal on to a second BCM 120 via a second index signal output connection (e). In like fashion, the second BCM 120 receives the index signal from the first BCM 110 through the first index signal input connection (f) and passes the index signal on to third BCM 130 via index signal output connection (e). The index signal is passed in this manner through each of the remaining BCMs (140,150,160) in the series link, and the last BCM 160 passes the index signal back to the index interface 196. This allows the BCIM 190 to determine the status of each of the BCMs (110,120,130,140,150,160) and the associated battery modules (112,122,132,142,152,162). The BCIM 190 uses the index signal to verify the operational status of the BCMs (110,120,130,140,150,160) and to quantify the number of BCMs (110,120,130,140,150,160) in the series.

As previously discussed in this detailed description of the invention, any number of battery module parameters can be monitored for independent adjustment of the state-of-charge based upon the battery module parameters, such as temperature, voltage, auxiliary charge current, etc. The monitoring and independent adjustment occurs during the various phases of battery operation including drive, regenerative braking, charging, standby, etc. For the most preferred embodiments of the present invention, equalization occurs by converting energy from the battery modules (112,122,132,142, 152,162) using a system of isolated power converters preferably operate from approximately zero (0) watts/module to five hundred (500) watts/module, and more preferably operate from approximately twenty (20) watts/module to three hundred (300) watts/module. The balancing and equalization of energy between the various battery modules occurs can be based on one or more parameters, such as the control set-points, that are determined by the BCIM 280 and downloaded to each of the BCMs (110,120,130,140,150,160) as previously described in this detailed description of the invention It should be noted that the battery pack 100 of the present invention is not dependent on voltage for determining and effectuating energy equalization. While voltage may be one battery module parameter, other battery module parameters such as temperature, state-of-charge, etc. can also be considered in accordance with the present invention, and can be considered utilized individually or in one or more combinations. As previously mentioned, the one or more parameters, such as the control set-point parameters are loaded into BCIM 190 and then transferred to each of the BCMs (110,120,130,140,150,160). The one or more parameters can be changed as necessary to accomplish the specific balancing and equalization regime desired for a given application.

While the use of BCMs (110,120,130,140,150,160) as described herein can improve the efficiency of the battery system, additional enhancements to the overall system can be made. By expanding the concepts of energy equalization used for the individual battery modules to additional battery packs, an overall increase in operation efficiency of the battery system is possible. These additional enhancements include the adoption of the methods and techniques described in conjunction with FIG. 2.

Figure 2:
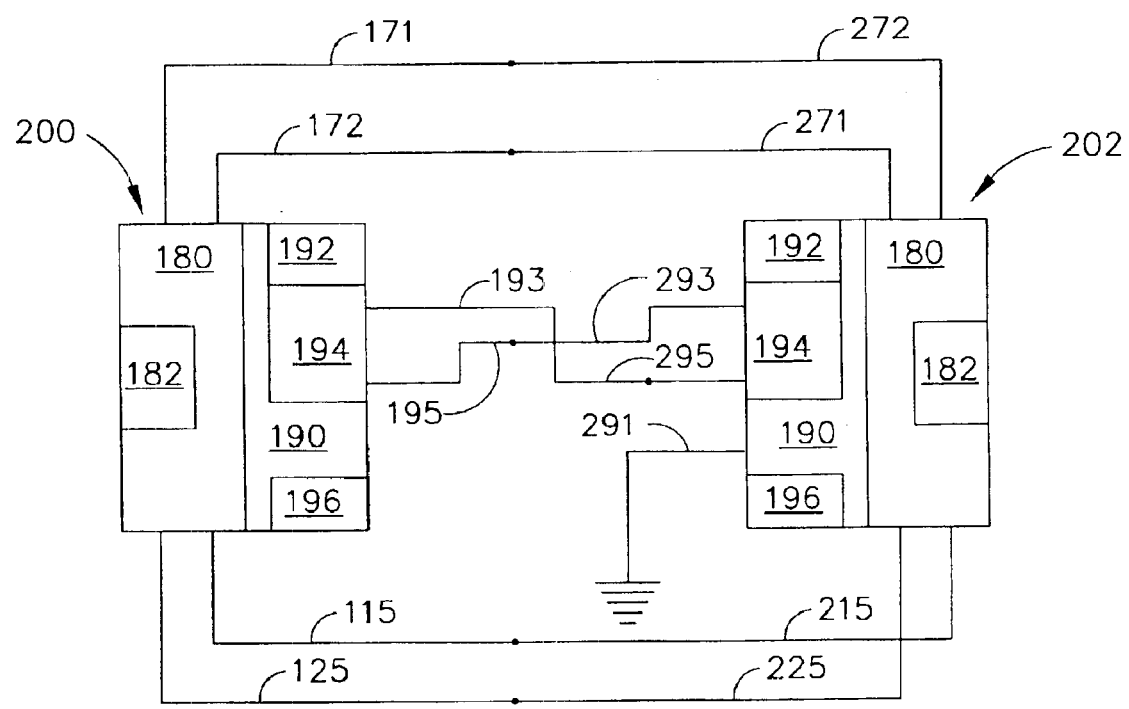
FIG. 2 is a schematic representation of a two interconnected battery packs for a battery powered vehicle in accordance with a preferred exemplary embodiment of the present invention.

Referring now to FIG. 2, a first battery pack 200 and a second battery pack 202 are coupled to form a multiple battery pack 204. At least one of the first battery pack 200 and the second battery pack 202 is configured as the battery pack 100 of FIG. 1, and both the first battery pack 200 and the second battery pack 202 are preferably configured as the battery pack 100 of FIG. 1. Furthermore, more than two battery packs can be coupled as subsequently described to form the multiple battery pack 204. In addition, for the sake of clarity and simplicity, the BCMs and other supporting components associated with battery pack 100 of FIG. 1 are not shown, and only the BCIM portion of each battery pack is depicted in FIG. 2. Accordingly, specific details regarding the first battery pack 200 and/or the second battery pack 202 can be ascertained by reviewing the description of battery pack 100 in conjunction with FIG. 1.

The system data interface lines (193,195) for the first battery pack 200 and the system data interface lines (293, 295) for the second battery pack 202 are used to couple the first battery pack 200 and the second battery pack 202. In this case, the system data interface lines (193,195,293,295) are preferably implemented as serial data lines. However, any number of system data interface lines can be utilized in accordance with the present invention. The first system data interface line 193 of the first battery pack 200 is connected to the second data interface line 295 of the second battery pack 202 and the second data interface 195 of the first battery pack 200 is connected to the first data interface line 293 of the second battery pack 202. In the most preferred embodiment of the present invention, the connections of the system data interface lines (193,195,293,295) form a serial data bus and allow the first battery pack 200 and the second battery pack 202 to send system level signals to each other and to communicate status information back and forth.

The most preferred embodiments of the multiple battery pack 204 of the present invention use at least two battery packs, each of which is comprised of battery modules, with each of the battery modules monitored by a BCM as described in conjunction with FIG. 1. One of the battery packs (200,202) is preferably designated as a master battery pack, and in accordance with the present invention, this is accomplished with a grounded signal line 291 as shown in FIG. 2 for designation of the second battery pack 202 as the master battery pack. However, the first battery pack 200, or other battery packs of the multiple battery pack 204 can be designated as the master battery pack, and other techniques can be used to provide the designation. The battery pack 202 designated as the master battery pack will preferably provide a supervisory function for safety mechanisms and battery pack-to-battery pack communication. Each of the battery packs (200,202) preferably communicates time-based and asynchronous data to the overall vehicle system. Additionally, safety-related activities occur in real time and the master pack serves as a synchronizer of events within the multiple battery pack 204.

The first battery pack 200 and the second battery pack 202 are preferably connected in series configuration. The series configuration is implemented by connecting the negative side of the first battery pack 200 to the negative power source/load and the positive side of first battery pack 200 to the negative side of second battery pack 202. The positive output of the second battery pack 202 is then connected to the positive power source/load. This flexible configuration is used so the module groupings can be packaged in different physical locations within the electric vehicle or hybrid vehicle. In addition, multiple packaging options can be adopted for the vehicle battery system. It should be noted that while the exemplary embodiment is described herein with a series connection, the first battery pack 200 and the second battery packs 202 can connected in a parallel configuration.

Interlock loop communication between the first battery pack 200 and the second battery pack 202 is provided by physically routing of a signal between these two battery packs (200,202) and any other battery packs of the multiple battery pack 204. This interlock loop is preferably a hardware interlock. In the most preferred embodiments of the present invention, a sense line is connected between the battery packs (200,202) and threaded through quick access connectors for each of the battery packs (200,202). As shown in FIG. 2, interlock out signal 171 from the first battery pack 200 is cascaded into an interlock in signal 272 of the second battery pack 202, and interlock out signal 271 from the second battery pack 202 is cascaded into the interlock in signal 172 of the first battery pack 202.

This system operates in a similar fashion as the index function described in conjunction with FIG. 1. However, in this case, if the interlock signal is disrupted, none of the battery packs (200,202) are preferably activated since the disruption may be indicative of a problem with the system. In addition, a synchronous serial data message is also transmitted on a periodic basis from one battery pack to the other. If this synchronous data message is not received in the expected time frame, the battery packs will be disconnected from the from the power source/load. The same disconnect feature may be activated whenever a predetermined fault occurs and will accomplish a simultaneous real-time disconnect of the battery packs.

The first battery pack 200 and the second battery pack 202 are also preferably connected with a first communication bus 115 and a second communication bus 125 of the first battery pack 200 to a first communication bus 215 and a second communication bus 225 of the second battery pack 202. This connection provided with the communication buses (115, 125,215,225) preferably allows the multiple battery pack 204 to balance and equalize the energy between battery packs. In the most preferred embodiments of the present invention, each of the battery packs (200,202) is equipped with a PSPM for converting energy from the power source for charging the various battery modules within each of the battery packs (200,202). Additionally, in the most preferred embodiments, each PSPM is interconnected with the PSPM of the other battery packs (200,202). This allows for the effective and efficient transfer of energy from a battery pack with a higher state-of-charge to a battery with a lower state-of-charge within the multiple battery pack 204. In this fashion, the battery packs (200,202) can be continually balanced and equalized as previously discussed with reference to FIG. 1. Since the BCIMs of each battery pack is communicating with the BCIMs of the other battery packs, the state-of-charge can be communicated from one BCIM to another BCIM.

Whether connected or disconnected, the first battery pack 200 and the second battery pack 202 is capable of communicating the status of various internal systems using the serial bus represented by the system data interface lines (193,195,293,295). In addition, even if an individual battery pack is in a standby/disconnected state, it can still share energy with the other battery modules within another battery pack via the isolated interconnect connecting each BCM. This shared energy configuration not only allows the internal battery system to balance the battery modules within each battery pack, but also enables the multiple battery pack 204 to balance various battery packs utilized by the vehicle. This energy sharing can occur during various vehicle operational modes, including vehicle propulsion and battery re-charging cycles.

When energy is requested by the vehicle, each battery pack checks for internal faults. Internal faults can be communicated using serial data interface 192. If no internal faults are reported, each battery pack will preferably energize/de-energize the relays (165,175,185) for the respective battery pack as shown in FIG. 1. Then, each BCIM will check the system for external faults that might create an undesirable situation when the power source is drawn upon. If any fault is present, the interlocks between battery packs are broken and a fault message is sent via the serial data interface 192. If no faults are present, the battery packs (200,202) are connected asynchronously by both initiating and completing a pre-charge sequence.

Once the power source has reached a specified operating limit, both pre-charge relays 185 as shown in FIG. 1 are opened, based on the status of the respective battery pack. Once the first battery pack 200 and the second battery pack 202 are connected, these two battery packs (200,202) form one battery pack and the communication occurs through the battery packs (200,202) with the master battery pack supervision. Additionally, battery system related data and other information may be transmitted from and received by various components on a controller area network (CAN). Once connected in this fashion, each of the battery packs (200, 202) is capable of detecting local faults while system-level faults are detected using shared information which is passed via data signals transmitted to and from the first battery pack 200 and the second battery pack 202 using their respective system data interfaces (194, 294). Additionally, in the most preferred embodiments of the present invention, a synchronous signal must be periodically transmitted to and from each battery pack to the master battery pack or a system-level fault is generated and the system will clear the power source. It should be noted that the exemplary embodiments depicted herein may be adapted to any battery technology, including lead-acid, nickel metal hydride, and lithium batteries. Additionally, the flexible nature of the control parameters contained in BCIMs (190,290) provide a great deal of flexibility in controlling the equalization of the energy in the first battery pack 200 and the second battery pack 202. Adaptive active control methods can be implemented using any specific parameter or combination of parameters to determine actual capacity and state-of-charge for individual battery modules.

From the foregoing description, it should be appreciated that a battery pack for a battery-powered vehicle is provided in accordance with the present invention. The battery pack of the present invention provides numerous advantages such as increased efficiency, increased reliability, and enhanced maintenance in the operation of the battery pack or battery packs. In addition, the battery pack of the present invention reduces the need for undesirable operational techniques, such as overcharge equalization. Finally, the flexible nature of the battery pack of the present invention allows active control for implementing any given parameter to determine actual battery module capacity and state-of-charge.

While certain elements have been presented in the foregoing detailed description of the preferred exemplary embodiments, it should be appreciated that a vast number of variations in the embodiments exist. It should also be appreciated that the preferred exemplary embodiments are only examples, and are not intended to limit the scope, applicability, or configuration of the invention in any way. Rather, the foregoing detailed descriptions provide those skilled in the art with a convenient road map for implementing the preferred exemplary embodiments of the invention. It should also be understood that various changes may be made in the function and arrangement of elements described in the preferred exemplary embodiments without departing from the spirit and scope of the invention as set forth in the appended claims.

What is claimed is:

1. A battery pack for a battery-powered vehicle, comprising:
    a plurality of battery modules coupled in series, said plurality of battery modules configured to provide power to the battery-powered vehicle and each of said plurality of battery modules having a state-of-charge;
    a plurality of battery control modules coupled to said plurality of battery modules, each of said plurality of battery modules coupled to at least one of said plurality of battery control modules and each of said plurality of battery control modules configured to monitor a battery module parameter;
    a battery control interface module coupled to each of said plurality of battery control modules, said battery control interface module configured to receive said battery module parameter from each of said plurality of battery control modules and independently adjust said state-of-charge of each of said plurality battery modules based on said battery module parameter; and
    a plurality of relays configured to couple said plurality of battery modules to a power source.

2. The battery pack for the battery-powered vehicle of claim 1, wherein at least one of said plurality of battery modules comprises at least two batteries.

3. The battery pack for the battery-powered vehicle of claim 1, wherein at least one of said plurality of battery modules comprises a single battery.

4. The battery pack for the battery-powered vehicle of claim 1, wherein a single battery control module of said plurality of battery control modules is configured to monitor said battery module parameter of a single battery module of said plurality of battery modules.

5. The battery pack for the battery-powered vehicle of claim 1, wherein said battery module parameter is battery temperature.

6. The battery pack for the battery-powered vehicle of claim 1, wherein, said battery control interface module independently adjusts said state-of-charge of each of said plurality of battery modules based on said battery module parameter in order to equalize the amount of energy distributed among the plurality of battery modules.

7. The battery pack for the battery-powered vehicle of claim 1, wherein said battery control interface module independently adjusts said state-of-charge of each of said plurality of battery modules based on said battery module parameter by providing an equalization current to a first battery module of said plurality of battery modules while discontinuing to provide said equalization current to a second battery module of said plurality of battery modules.

8. The battery pack for the battery-powered vehicle of claim 1, wherein said battery control modules are connected in series.

9. The battery pack for the battery-powered vehicle of claim 1, further comprising a current sensor that is configured to monitor current flowing through said battery modules, said current sensor transmitting said current flowing through said battery modules to said battery control interface module.

10. The battery pack for the battery-powered vehicle of claim 1, wherein said battery control interface module is configured to provide control set-points to the battery control modules for independently adjusting said state-of-charge of each of said plurality battery modules based on said battery module parameter.

11. The battery pack for the battery-powered vehicle of claim 1, wherein said battery-powered vehicle is a hybrid electric vehicle.

12. A multiple battery pack for a battery-powered vehicle, comprising:
 a first battery pack, said first battery pack comprising:
  a first plurality of battery modules coupled in series, said first plurality of battery modules configured to provide power to the battery-powered vehicle and each of said first plurality of battery modules having a first state-of-charge;
  a first plurality of battery control modules coupled to said first plurality of battery modules, each of said first plurality of battery modules coupled to at least one of said first plurality of battery control modules and each of said first plurality of battery control modules configured to monitor a first battery module parameter; and
  a first battery control interface module coupled to each of said first plurality of battery control modules, said first battery control interface module configured to receive said first battery module parameter from each of said first plurality of battery control modules and independently adjust said first state-of-charge of each of said first plurality battery modules based on said first battery module parameter; and
 a second battery pack coupled to said first battery pack.

13. The multiple battery pack for the battery-powered vehicle of claim 12, further comprising a third battery pack coupled to said second battery pack.

14. The multiple battery pack for the battery-powered vehicle of claim 12, wherein said second battery pack comprises:
 a second plurality of battery modules coupled in series, said second plurality of battery modules configured to provide power to the battery-powered vehicle and each of said second plurality of battery modules having a second state-of-charge;
 a second plurality of battery control modules coupled to said second plurality of battery modules, each of said second plurality of battery modules coupled to at least one of said second plurality of battery control modules and each of said second plurality of battery control modules configured to monitor a second battery module parameter; and
 a second battery control interface module coupled to each of said second plurality of battery control modules, said second battery control interface module configured to receive said second battery module parameter from each of said second plurality of battery control modules and independently adjust said second state-of-charge of each of said second plurality battery modules based on said second battery module parameter.

15. The multiple battery pack for the battery-powered vehicle of claim 13, wherein said third battery pack comprises:
 a third plurality of battery modules coupled in series, said third plurality of battery modules configured to provide power to the battery-powered vehicle and each of said third plurality of battery modules having a third state-of-charge;
 a third plurality of battery control modules coupled to said third plurality of battery modules, each of said third plurality of battery modules coupled to at least one of said third plurality of battery control modules and each of said third plurality of battery control modules configured to monitor a third battery module parameter; and
 a third battery control interface module coupled to each of said third plurality of battery control modules, said third battery control interface module configured to receive said third battery module parameter from each of said third plurality of battery control modules and independently adjust said third state-of-charge of each of said third plurality battery modules based on said third battery module parameter.

16. The multiple battery pack for the battery-powered vehicle of claim 12, wherein at least one of said first plurality of battery modules comprises at least two batteries.

17. The multiple battery pack for the battery-powered vehicle of claim 12, wherein at least one of said first plurality of battery modules comprises a single battery.

18. The multiple battery pack for the battery-powered vehicle of claim 12, wherein a single battery control module of said first plurality of battery control modules is configured to monitor said first battery module parameter of a single battery module of said first plurality of battery modules.

19. The multiple battery pack for the battery-powered vehicle of claim 12, wherein said battery-powered vehicle is a hybrid electric vehicle.

* * * * *